United States Patent [19]
Turkevich et al.

[11] 3,865,830
[45] Feb. 11, 1975

[54] THIOPHOSPHAMIDE DERIVATIVES OF ISOQUINOLINE ALKALOIDS, METHOD OF PRODUCING AND APPLICATION THEREOF

[76] Inventors: Nikolai Mikhailovich Turkevich, ulitsa Khasanskaya, 8, kv. 7; Maria Stepanovna Olievskaya, ulitsa Mironjuka, 44; Julia Maximovna Pashkevich, ulitsa Vishenskogo, II, kv. 5; Anatoly Ivanovich Potopalsky, prospekt Lenina, 35, kv. 5; Vasily Mikhailovich Novitsky, ulitsa Verkhovinskaya, 7, kv. I, all of Lvov, U.S.S.R.

[22] Filed: June 20, 1972

[21] Appl. No.: 264,482

Related U.S. Application Data
[62] Division of Ser. No. 45,266, June 10, 1970, abandoned.

[30] Foreign Application Priority Data
June 16, 1969 U.S.S.R.............................. 1330542

[52] U.S. Cl......... 260/283 P, 260/239 EP, 424/258
[51] Int. Cl............................................. C07d 39/00
[58] Field of Search ....... 260/283 P, 289 A, 239 EP

[56] References Cited
UNITED STATES PATENTS

| | | | |
|---|---|---|---|
| 2,663,705 | 12/1953 | Parker............................ | 260/288 R |
| 2,672,459 | 3/1954 | Kuh................................ | 260/239 EP |
| 3,150,149 | 9/1964 | Uhlenbroek....................... | 260/310 |
| 3,446,812 | 5/1969 | Seeger............................ | 260/288 R |
| 3,538,080 | 11/1970 | Ham.............................. | 260/239 EP |

OTHER PUBLICATIONS
Turkevich et al., Chem. Abstr. Vol. 75, Col. 49393t (1971) abstracting German, 2,028,330.

*Primary Examiner*—Donald G. Daus
*Attorney, Agent, or Firm*—Holman & Stern

[57] ABSTRACT

The present invention relates to novel new compounds which comprise thiophosphoamide are thiophosphamide derivatives of isoquinoline alkaloids having the general formula:

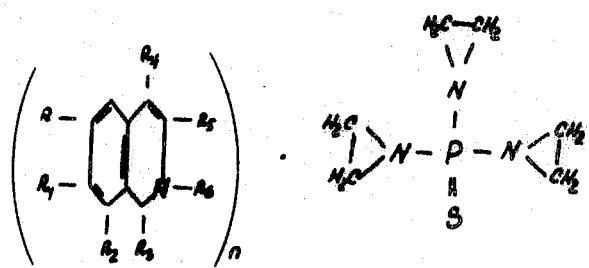

$R_3=H;OH; CH_3; R_4 + R_5$ and $R_5 + R_6 = H_2$; substituted naphthalene ring, or wherein $R_6$ may be is absent; and wherein $n$ ranges fro 1 to 3, and to a method of producing these compounds, as well as the application thereof.

The method of producing the said compounds comprises reacting thiophospharamide with an separate isoquinoline alkaloid or with a mixture of said alkaloids in an organic solvent at the boiling point thereof. The resulting target product is isolated.

Said compounds feature pharmacological activity and finds application in medicine as preparation for treating malignant tumors.

3 Claims, No Drawings

THIOPHOSPHAMIDE DERIVATIVES OF ISOQUINOLINE ALKALOIDS, METHOD OF PRODUCING AND APPLICATION THEREOF

This is a divisional, of application Ser. No. 45,266, filed June 10, 1970, now abandoned.

The present invention relates to new compounds which are thiophosphoramide derivatives of isoquinoline alkaloids, and to a method of their production and their application.

Said new compounds, according to the invention, have the following general formula:

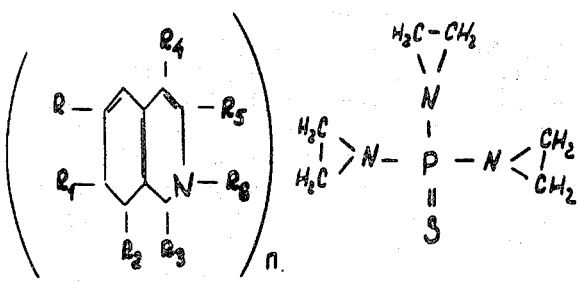

$R_3 = H$; OH; $CH_3$; $R_4 + R_5$ and $R_5 + R_6 = H_2$; substituted naphthalene ring, or $R_6$ maybe absent; and $n$ ranges from 1 to 3.

The present new compounds are fine-crystalline powders of yellowish or light brown colour; they are readily soluble in dimethyl sulphoxide, dimethyl formamide, chloroform and other organic solvents, and slightly soluble in water.

The new compounds feature pharmacological activity and are applicable in medicine as preparations for treating malignant tumors; they also can find application as chemical hybridization mutagens for agricultural plants and as pesticides and insecticides for microorganisms.

The most active substances of the above specified class of compounds are di-[ethylenemido]-N-berberinolethylamide of thiophospharamide acid, tri-[N-sanguinarino]-ethylamide of thiophosphoric acid, and thiophosphamide derivatives of isoquinoline alkaloids extracted from *Chelidonium majus L*.

According to the invention, di-[ethyleneimido]-N-berberinol-ethlamide of thiophosphoric acid, tri-[N-sanguinarinol]-ethylamide of thiophosphoric acid and thiophosphoramide derivatives of isoquinoline alkaloids from *Chelidonium majus L* are used as the active principles in medicinal preparations for treating malignant tumors. Said preparations are used in treating tumors of the thoracic gland, ovary, uterine neck, urinary bladder, prostate, larynx, oesophagus, and anatomical localizations. The mechanism of their action resides in the fact that they exert influence in the intimate mechanisms of cyto-metabolism, which are responsible for disturbances in the synthesis of nucleic acids, and which influences a greater manifestation of the aerobic respiration phase.

In experiments on rats and mice having tumors which differ with respect to the histologic structure and origin thereof, i.e., (Guerin's carcinoma, Walker's carcinosarcoma, Crocker' sarcoma, haematoma PC—1, ascitic carcinoma of ovaries strain $O_я$), all of the above-cited preparations cause complete resolution of the above of tumors in the majority of test animals, with the exception of the $O_я$ strain. At the same time, there are certain differences in the spectrum of the antitumoric effect. Thus, for example, di-[ethyleneimido]-N-berberinolethylamide of thiophosphoric acid and tri-[N-sanguinarinol]-ethylamide of thiophosphoric acid employed in doses of adequate toxicity feature a more pronounced effect with respect to the experimental tumors of the liver, which fact is associated with a certain selective alkaloid action comprised in said compounds on the hepatic tissue.

A distinctive feature of the antitumoric effects of the new preparations is the absence of the latent period, which results in a manifest action after first injections, this being a special importance when treating intensively growing tumors and thus precluding the development of drug resistance in the tumor cells. The manifestation of the antitumoric effect of the new compounds sharply differs from that of the starting compounds, that is, of the isoquinoline alkaloids and thiophosphoramide. Thus, for example, the sum of the alkaloids of *Chelidonium majus* causes only 25.7 percent inhibition of the growth of the Guerin's carcinoma and 28.5 percent inhibition of the ascitic carcinoma in rats of the O я strain, and the thiophosphoramide causes 97 and 37 percent inhibition respectively (in case of a sharply pronounced leucopenia). The application of the new preparation causes on inhibition in the same kind of tumors on the order of 98 and 60 percent, respectively.

In contradistinction to the majority of the now-existing antitumoric preparations, the said new preparations, even in maximum tolerence doses, have no depressive effect on haematopoiesis, and therefore they can be used in combination with other antitumoric preparations, as well as with beam therapy techniques. Said new preparations feature a lower toxicity than the initial compounds. the $LD_{50}$ of thiophosphoramide is 3–10 mg/kg, that of the berberine alkaloid is 21 mg/kg, and the $LD_{50}$ of the product of their interaction, when administered by intraabdominal injection, is 34.2 mg/kg for mice and 33 mg/kg for rats. The $LD_{50}$ of the product of interaction of thiophosphoramide with sanguinarine is 21 mg/kg, and that of the thiophosphoramide derivatives of the isoquinoline alkaloids of *Chelidonium majus* is 227.1 mg/kg and 302.1 mg/kg respectively.

The action of the preparation, viz., of the thiophosmide derivatives of the isoquinoline alkaloids of *Chelidonium majus*, was clinically tested in about 300 patients. The preparation was applied in treating tumors of the thoracic gland, ovaries, uterine neck, urinary bladder, prostate, larynx, oesophagus, and other anatomical localizations. A noticeable antitumoric effect (resolving of the main tumor and metastatic nodes) was observed in 35–45 percent of the patients with far gone forms of the process in the III–IV stage.

The preparation was administered by intramuscular injections in doses increasing from 0.25 to 1 mg/kg, and also in the forms of ointments and suppositories.

The course of treatment consisted of 15–20 intramuscular injections at 48 hour intervals. After a month break a second course of treatment was prescribed, and then after 3, 6 and 12 months, courses of treatment were prescribed for precluding cases of recidivation.

According to the invention, the medicinal preparations comprise an active principle in combination with a diluent. It is preferable to use a diluent of the following composition (in parts by weight): water, 1.5; polyethylene glycol with M.W. of 400, 1.5; and dimethyl sulphoxide, 2. It is expedient that the content of the active principle in the solution be 0.3–0.5 wt. percent.

The medicinal preparation may also comprise the active principle in combination with an ointment base. As the ointment base medicinal vaseline and anhydrous lanoline may be used with the addition of a diluent having the following composition (in parts by weight): water, 1.5; polyethylene glycol with a M.W. of 400, 1.5; and dimethyl sulphoxide, 2. It is expedient that the content of the active principle in the ointments should be from 0.3–0.5 wt percent. It is likewise recommendable to use a medicinal preparation which comprises the active principle in combination with a pharmaceutical base as suppositories. As the base for the suppositories use may be made of cacao oil and anhydrous lanoline with the addition having a diluent of the following composition (in parts by weight): water, 1.5; polyethylene glycol, M.W. 400, 1.5; dimethyl sulphoxide, 2. It is preferable to employ suppositories containing from 0.03 to 0.05 wt. percent of the active principle.

Said medicinal preparations are contraindicated in such cases as in the terminal stages of the illness, grave troubles in the kidneys, having renal insufficiency phenomena, grave troubles in the cardiovascular system having cardiac insuficciency phenomena.

Said medicinal preparations do not lose their activity when stored for as long as 2 years under low temperature conditions in premises protected from incident light.

According to the invention, the said new compounds, that is, thiophosphoramide derivatives of isoquinoline alkaloids, are produced by reacting thiophosphoramide with separate alkaloids of the isoquinoline series having the following general formula:

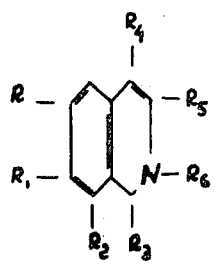

$R_3 = H$; $OH$; $CH_3$; $R_4 + R_5$ and $R_5 + R_6 = H_2$; and substituted napthalene ring, or where $R_6$ is absent; or with a as the boiling point thereof, with subsequent isolation of the target product.

In order to increase the yield of the target product, the use of benzene, chloroform or dioxane as organic solvents is most expedient.

When producing di-[ethyleneimido]-N-berberinolethylamide of thiophosphoric acid, the thiophosphoramide is reacted with berberine in dioxane at the boiling point of the latter, with the subsequent isolation of the target product.

When producing tri-[N-sanguinarinol]-ethylamide of thiophosphoric acid, the thioposphoramide thiophosphamide is reacted with sanguinarine in benzene at the boiling point of the latter, with a subsequent isolation of the target product.

The present method is effected as follows.

The starting compounds, that is thiophosphoramide alkaloids of the isoquinoline series, either above, or mixtures thereof, are interreacted in an organic solvent medium at the boiling point of the latter. The ethylene imine cycles of the thiophosphoramide are broken in order to form the target products.

Alkaloids, belonging to the group of quaternary ammoniam bases (such as berberine, sanguinarine, oxysanguinarine, coptisine, and the like), behave as amino alcohols, since the process is carried out in an anhydrous medium. These alkaloids in the anhydrous state are known to be amino alcohols. Thus, for example, an alkaloid such as berberine is termed berberinol in an anhydrous medium, features the following structure:

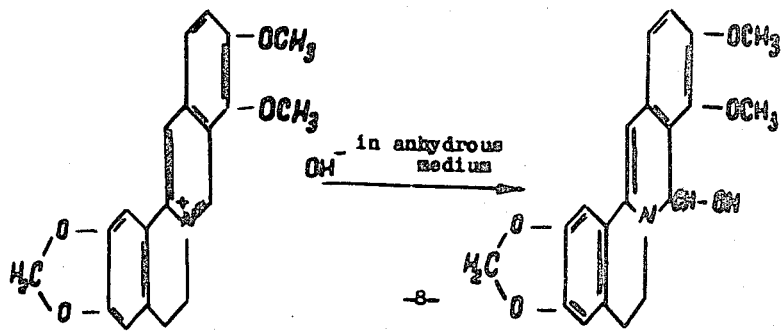

In the course of interaction, said alkaloids, behaving as amino alcohols, cause aminolysis of the thiophosphoramide thiophosphamide, that is, breaking of the ethylene imine rings which may be represented as

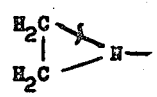

with the formation of intraionic compounds

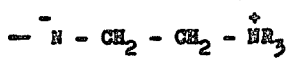

The target products obtained by the interaction reaction are isolated by distilling-off the solvent from the reaction mixture, by washing-off the unreacted starting materials and recrystallization of the target product. When the target product is to be produced by reacting thiophosphoramide with a mixture of the alkaloids of *Chelidonium majus*, the solvent is distilled from the reaction mixture, the residue washed to remove the unreacted starting materials, and the target product subsequently isolated. The yield of the target product is For the better understanding of the present invention given hereinbelow are examples illustrating the realization of the present method of producing thiophosphoramide derivatives of isoquinoline alkaloids.

EXAMPLE 1

7.15 millimols of sanguinarine (M.P. 267°C.) and 14.27 millimols of thiophosphoramide are dissolved in 700 ml of benzene, and the mixture is refluxed in a flask for 2 hours. The resulting mixture is decolorized with activated charcoal and the solvent is distilled off. The dry residue is thoroughly washed with ether to remove the unreacted staring materials. 1.5 g of tri-[N-sanguinarino]-ethylamide of thiophosphoric acid are obtained, which is a yellowish crystalline substance, and soluble in benzene, chloroform, dimethyl formamide and dichloroethane, sparingly soluble in water, soluble in 10 percent hydrochloric acid when heated, and insoluble in methanol and ether. The yield is 50.8 wt. percent of theory.

The M.P. (in a mixture of chloroform and methanol) is 189°–191°C. Absorption peaks: 238, 338 and 407 mmn.

$C_{66}H_{57}N_6O_{15}PS$. Calctd., in percent: S, 2.59; N, 6.79; P, 2.50; C, 64.07; H, 6.64.
Found, in percent: S, 2.70; 2.72; N, 6.82; 6.90; P, 2.45; 2.62; C, 63.80; 63.87; H, 4.60; 4.71.

EXAMPLE 2

8.86 millimols of berberine (base) and 13.5 millimols of thiophosphoramide are refluxed in a flask in 600 ml of anhydrous dioxane for 2 hours. The resulting mixture is decolorized with activated charcoal and the solvent is distilled off under a vacuum of 10 mm Hg. The dry residue is washed with ether and chloroform, with 3.3 g. of di-[ethyleneimido]-N-berberinoethylamide of thiophosphoric acid being thus obtained, which is a dark yellow crystalline substance, soluble in hot hydrochloric acid, and sparingly soluble in conventional organic solvents. The yield is 97 wt. percent of theory. M.P. (in a mixture of benzene and dimethyl sulphoxide) is 135°C.

$C_{26}H_{31}N_4O_5PS$. Calctd. (in percent) S, 5.91; N, 10.37; P, 10.33; C, 57.55; H, 5.76.
Found (in percent): S, 5.90; 5.79; N, 10.52; 10.54; P, 10.41; 10.39; C, 57.40; H, 5.84.
Absorption peaks: 231; 282; and 373 mmn.

EXAMPLE 3

3.5 g of alkaloids obtained from an aqueous extract of *Chelidonium majus* L (average mole 331) and 3.8 g. (20.1 millimols of thiophosphoramide are dissolved in 60 ml of chloroform and refluxed in a flask for 2 hours. The resulting product is decolorized with activated charcoal and the solvent distilled off. The dry residue is thoroughly washed with ether to remove the unreacted starting materials. 1.45 g of the desired product are obtained, which is a light brown substance, which is soluble in chloroform, dimethyl sulphoxide and dimethyl formamide, sparingly soluble in dichloroethane, dioxane and methanol, and insoluble in water and ether. The yield is 34.5 wt. percent.

Approximate average molecular weight is 1120.
Calctd (in percent): S, 2.86; N, 7.50.
Found (in percent): S, 2.82; N, 7.60.
Absorption peak: 284 mmn.

EXAMPLE 4.

The process of interaction is carried out as described in Example 3, with benzene being used as the organic solvent.

The yield of the target product is 35 wt. percent.
Approximate average molecular weight is 1180.
Calctd (in percent): S, 2.72; N, 7.12.
Found (in percent): S, 2.64; 2.62; N, 7.30; 7.25.
Absorption peaks: 271; and 375 mmn.

What is claimed is:

1. A method 9, wherein triethylenethiophosphoramide is reacted with berberine in dioxane at the boiling point of the latter, with a subsequent isolation of the formed di-[ethyleneimido]-N-berberinolethylamide of thiophosphoric acid.

2. A method as claimed in claim 1, wherein benzene, chloroform or dioxane is used as the organic solvent.

3. A compound of the structure:

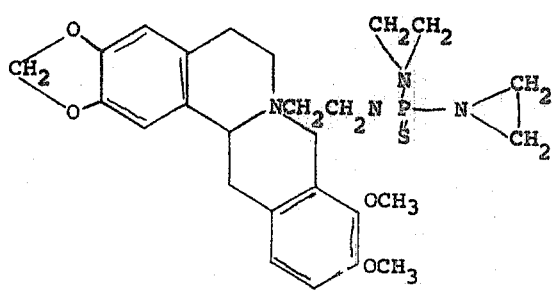

* * * * *